United States Patent
Bergman et al.

(10) Patent No.: US 8,063,568 B2
(45) Date of Patent: Nov. 22, 2011

(54) REMOTE COLOR CONTROL DEVICE AND LIGHTING SYSTEM

(75) Inventors: Anthonie Hendrik Bergman, Eindhoven (NL); Franciscus Paulus Maria Budzelaar, Eindhoven (NL); Hubertus Maria Rene Cortenraad, Maastrich (NL); Oscar Hendrikus Willemsen, Eindhoven (NL); Eduard Johannes Meijer, Eindhoven (NL); Ralph Kurt, Eindhoven (NL); Eindhoven Petrus Carolus Michael Krijn, Weil im Schoenbuch (NL); Elmo Marcus Attila Diederiks, Eindhoven (NL); Bartel Marinus Van De Sluis, Eindhoven (NL); Galileo June Destura, Eindhoven (NL); Bart Andre Salters, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 997 days.

(21) Appl. No.: 11/993,491

(22) PCT Filed: Jun. 23, 2006

(86) PCT No.: PCT/IB2006/052047
§ 371 (c)(1),
(2), (4) Date: Dec. 21, 2007

(87) PCT Pub. No.: WO2007/004097
PCT Pub. Date: Jan. 11, 2007

(65) Prior Publication Data
US 2010/0045205 A1    Feb. 25, 2010

(30) Foreign Application Priority Data
Jun. 30, 2005    (EP) .................................... 05105915

(51) Int. Cl.
*H05B 37/02* (2006.01)
(52) U.S. Cl. .................... 315/149; 315/152; 315/153
(58) Field of Classification Search .......... 315/149–155, 315/294, 297, 307, 308, 312
See application file for complete search history.

(56) References Cited

U.S. PATENT DOCUMENTS

| 6,798,517 | B2 | 9/2004 | Wagner et al. |
| 6,827,464 | B2 | 12/2004 | Koren et al. |
| 2002/0163316 | A1 | 11/2002 | Lys et al. |
| 2002/0171378 | A1* | 11/2002 | Morgan et al. ................ 315/291 |
| 2003/0133292 | A1 | 7/2003 | Mueller et al. |

FOREIGN PATENT DOCUMENTS

| EP | 1113709 A2 | 7/2001 |
| WO | 9323977 A1 | 11/1993 |
| WO | 0136864 A2 | 5/2001 |
| WO | 03024269 A1 | 3/2003 |
| WO | 03078894 A1 | 9/2003 |

OTHER PUBLICATIONS

Hans-Peter Herzig: Remote Control Unit Using Visible Light, Motorola, Technical Developments, Sep. 1998, pp. 32-33.

* cited by examiner

*Primary Examiner* — Douglas W Owens
*Assistant Examiner* — Jianzi Chen

(57) ABSTRACT

A device is disclosed for wireless control of color of light emitted by a lighting system. The lighting system comprises signal receiving means and means for adjusting the color of light emitted from at least one lighting element, in response to a received color control signal from the device. The device for wireless control comprises means for—generating color information data, said data being indicative of a desired color of light to be emitted by the lighting system, means for modulating a first carrier signal in accordance with the color information data, and means for transmitting said color control signal in the form of a beam of said first modulated carrier signal to the lighting system.

22 Claims, 2 Drawing Sheets

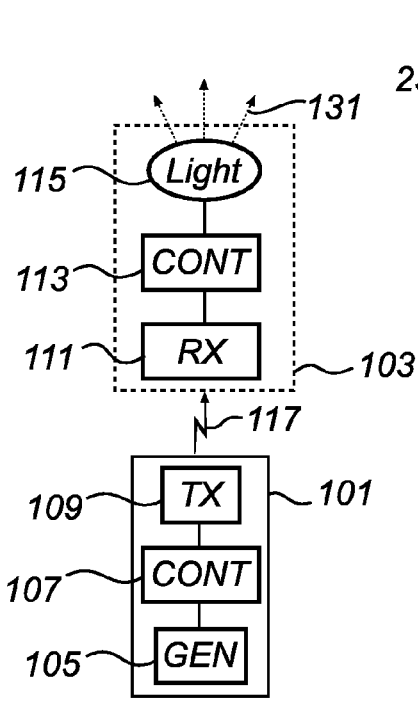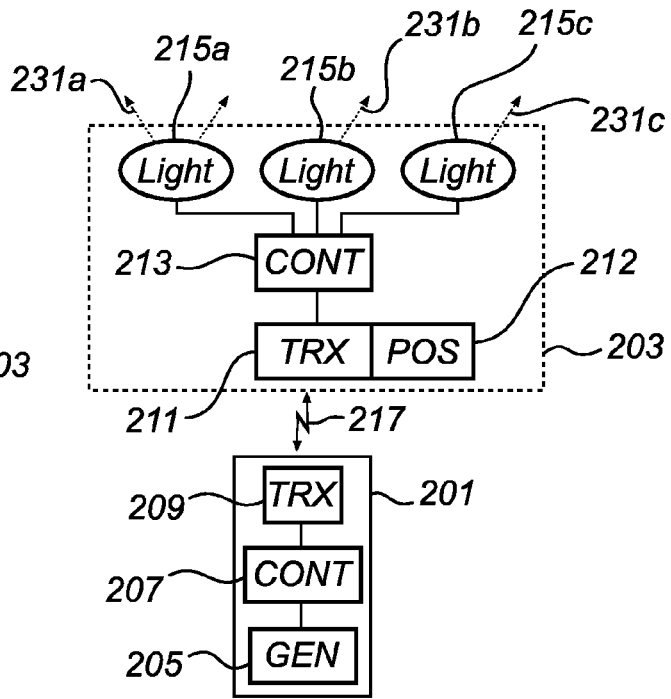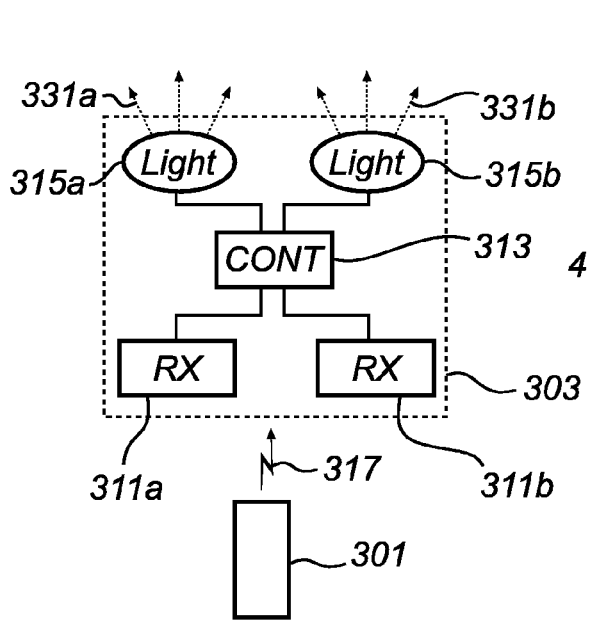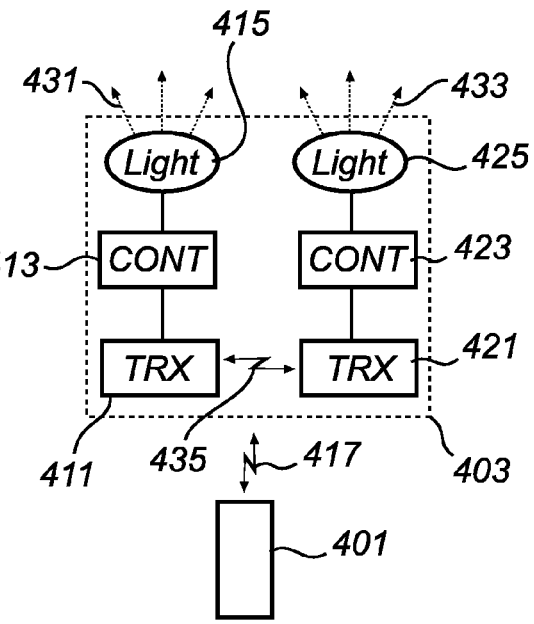
Fig. 1
Fig. 2
Fig. 3
Fig. 4

REMOTE COLOR CONTROL DEVICE AND LIGHTING SYSTEM

The present invention relates to a device for wireless control of color of light emitted by a lighting system, as well as a lighting system.

Light sources that are capable of producing a very large part of the spectrum of colored light have become more and more commonplace, both in private households and in commercial entities such as retail shops, pleasure grounds and discotheques. There is a desire, from a private household perspective, to be able to create essentially any color or atmosphere in the living room, bedroom etc. From the perspective of a commercial enterprise, the desire is to provide attractive colored displaying options for products and to provide an attractive atmosphere, e.g. in combination with music in a discotheque. Moreover, there is typically a desire to be able to quickly and intuitively change the color of the light output by such lighting systems.

What is lacking in the technical field of lighting systems at the moment are such devices that provide easy and intuitive ways to control the colors of the light sources in a lighting system. This is a problem, not least with regard to environments where large numbers of light sources are to be controlled.

Until now, essentially the only way in which lighting systems are controlled is to switch the light source(s) in the systems on or off, or possibly also dimming the light sources. One example of a prior art device for controlling light sources is disclosed in "Remote control unit using visible light", by Hans-Peter Herzig in Motorola Technical Developments, September 1998. A light beam is modulated with one or more AC frequencies. Aiming the light beam at a light source equipped with a decoding detector changes the status of a flip-flop, whereby the light source is either switched on or off. However, this device is not capable of controlling the color of the emitted light to be any desired color.

It is an object of the present invention to overcome this problem, and to provide an easy and intuitive way of controlling the light of a lighting system to be any desired color.

The object is achieved in different aspects as a device for wireless control of color of light emitted by a lighting system and a lighting system according to the appended claims.

Hence, in a first aspect, the invention provides a device for wireless control of color of light emitted by a lighting system. The lighting system comprises signal receiving means and means for adjusting the color of light emitted from at least one lighting element, in response to a received color control signal from the device. The device for wireless control comprises means for:

generating color information data, said data being indicative of a desired color of light to be emitted by the lighting system,
modulating a first carrier signal in accordance with the color information data, and
transmitting said color control signal in the form of a beam of said first modulated carrier signal to the lighting system.

The means for transmitting a beam are preferably configured to adjust the angular extent of the beam, thereby enabling simultaneous control of a plurality of lighting systems located at different locations as well as controlling a single lighting system in an environment where a plurality of lighting systems are arranged close to each other.

Preferably, the device comprises means for displaying the desired color, in such a manner that it is perceivable by a user of the device. This is an advantageous feedback feature that makes the device user-friendlier.

By incorporating means for storing the color information data, the device may be used to control a plurality of different lighting systems that are located at different sites. That is, a desired color may be "picked up" and transferred ("pasted") to a multitude of systems in an intuitive manner.

By also incorporating intensity control, the inventive device is even more useful in controlling a lighting environment to be as desired. Hence, the device may further comprise means for:

generating intensity information data, said data being indicative of a desired intensity of light to be emitted by the lighting system, and
modulating said first carrier signal also in accordance with the intensity information data.

Alternatively, a second carrier signal may be modulated in accordance with the intensity information data, and transmitted as a beam to the lighting system.

In a preferred embodiment of a device for wireless control of color of light emitted by a lighting system, the device utilizes light as a carrier for color information. Hence:

said means for generating color information data and said means for modulating a first carrier signal comprise color setting means configured to be set to said desired color and a color light unit configured to emit light of said desired color set by said color setting means, and
said means for transmitting a beam of said first modulated carrier signal comprises optical focusing means configured to focus said light emitted by said color light unit.

The emission of the desired light by the device is advantageous in that it provides an immediate feedback to a user, thereby making the use of the device simple and intuitive.

The device may also, or alternatively, be equipped with color detection means in such a manner that:

said means for generating color information data and said means for modulating a first carrier signal comprise color detection means and a color light unit configured to emit light of a color detected by said color detection means.

This is advantageous in that it enables a user to copy a desired color from a light source or a surface or object having the desired color.

Additionally, said means for modulating said first carrier signal also in accordance with the intensity information data might be configured to modulate the first carrier signal by a frequency, said frequency being indicative of said intensity information data.

This is advantageous in that the carrier signal is used efficiently, carrying both color information as well as encoded, i.e. modulated, intensity information.

In a preferred embodiment of a device for wireless control of color of light emitted by a lighting system, the device utilizes infrared (IR) radiation as a carrier for color information. Hence:

said means for generating color information data comprise color detection means configured to detect said desired color,
said means for modulating a first carrier signal comprise means for digital modulation of an IR-beam, and
said means for transmitting a beam of said first modulated carrier signal comprises optical focusing means configured to focus said IR-beam.

Preferably, the device further comprises means for generating a collimated light beam having a beam direction parallel to said IR-beam. This is advantageous in that it facilitates when pointing the (invisible) IR beam towards an intended target lighting system. The collimated beam may be any kind of light that is capable of reproducing a visible indication on a surface on which it is incident, such as a laser beam.

The color detection means may be configured to detect the desired color from a surface. In order to facilitate detecting from a surface, the color detection means may comprise a source of auxiliary light configured to illuminate said surface. The auxiliary light may be white light or any combination of more or less monochromatic light sources utilized, e.g., in a scanning fashion.

The means for generating color information data may be configured to perform a first color detection while said source of auxiliary light is active and a second color detection while said source of auxiliary light is inactive, and perform a comparison of results from said two color detections, said comparison yielding a determination of whether said first and second detections are of light emanating from a surface or not.

By such a configuration, the device will be able to establish whether or not to use a previous color detection for copying to a lighting system or to copy lamp settings to use a new color detection from a reference surface to control the color of the lighting system.

This is advantageous in a case where the device forms part of, e.g., an RC5 controlled lighting environment, where the device may be used in a simple manner to copy a color from a first lighting system to a second lighting system.

Said means for generating intensity information data may comprise rotation-sensing means configured to sense a rotational movement of the device and to quantify the sensed rotational movement into intensity information data.

In another preferred embodiment of a device for wireless control of color of light emitted by a lighting system, the device further comprises means for:
  generating and transmitting a beam of a selection signal, said selection signal for selecting a specific lighting element to receive said color control signal,
  receiving said system color information data from said selected lighting element, and where said means for displaying the desired color is configured to display the system color information.

That is, such a device is operable in combination with a lighting system that further comprises means for transmitting system color information data indicative of the color of light emitted from at least one lighting element and which is capable of receiving and responding to a selection signal from the device.

Preferably, the means for generating and transmitting a beam of a selection signal is further configured to transmit a beam of a de-selection signal for de-selecting said specific lighting element.

In a case where the lighting system further comprises means for transmitting system intensity information data indicative of the intensity of light emitted from at least one of said at least one lighting element, said device may further comprise means for:
  detecting a user action indicating that intensity information data is to be transmitted between the device and the system, and means for
  receiving said system intensity information data, and where said means for displaying the desired color is further configured to display the system intensity information.

Toggling may be facilitated in that the means for detecting a user action indicating that intensity information data is to be transmitted between the device and the system is further configured to detect a user action indicating that color information data is once more to be transmitted between the device and the system.

In a second aspect, the present invention provides a lighting system comprising means for adjusting the color of light emitted from at least one lighting element, in response to a control signal received from a device for wireless control of color of light emitted by the system as discussed above.

The system preferably comprises a plurality of lighting elements and at least one detector for detecting a minimum relative distance between the device for wireless control and respective lighting elements, and where said means for adjusting the color of light is configured to adjust a specific lighting element, said specific lighting element being determined by said determined minimum distance.

The system may be configured to adjust the color of at least two lighting elements in response to said received color control signal and also to adjust said color of light emitted from at least one lighting element gradually during a predetermined time period.

This and other aspects of the present invention will now be described in more detail, with reference to the appended drawings showing preferred embodiments of the invention.

FIGS. 1 to 4 show schematically block diagrams illustrating different configurations of a system and a device for wireless control according to the present invention.

Figure 5:
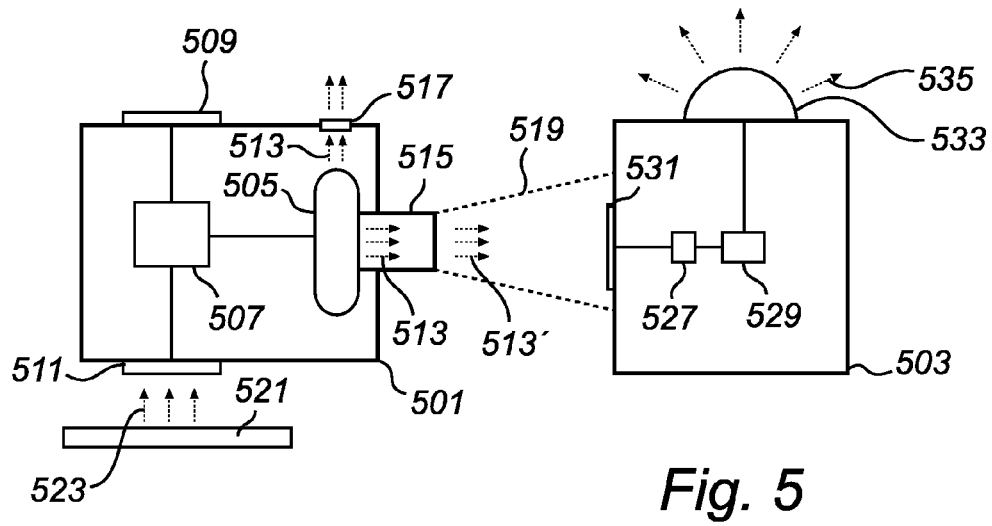
FIG. 5 shows schematically a block diagram illustrating one embodiment of a device for wireless control according to the present invention.

As the person skilled in the art will realize, a term commonly used for a device for wireless control is "remote control unit" or in an even shorter form as "remote control". These terms are to be understood as having the same meaning and hence being interchangeable throughout the detailed description to follow. Typically, the remote control devices to be discussed in the examples that follow are handheld, or at least portable, devices.

Before turning to detailed descriptions of embodiments of remote control devices, a few configurations of lighting systems and remote control devices will be discussed, illustrating, for example, that lighting systems may comprise any number of lighting elements and that communication channels between remote control devices and lighting systems may be unidirectional as well as bidirectional. The remote control devices that are illustrated in FIGS. 1 to 4 may be any of the devices for wireless control that will be described in FIGS. 5 to 7.

Moreover, it is to be noted that no detailed description will be given regarding the detailed operation of each specific lighting element. It is to be understood that the lighting elements that form part of the described systems are capable of reproducing visible light having essentially any desired color and intensity. The lighting elements are preferably realized in the form of multi color light emitting diode (LED) devices that, for example, conform to the RGB system of colors. Nevertheless, any other suitable controllable multi color light emitting elements may be used without departing from the scope of the invention. Additionally, no description will be given of any power supply means, as this is known in the art and would, if included here, only unnecessarily distract the reader and possibly also obscure the details of the invention.

FIG. 1 shows a basic configuration of a device 101 for wireless control of color of light 131 emitted by a lighting system 103. The remote control device 101 comprises electronic circuitry that is divided, at least in logical terms, into a color information data generator 105, a controller 107 and a signal transmitter 109. Moreover, as is known in the art, the different units may be realized in hardware circuitry as well as by means of programmable circuits utilizing appropriate software means.

The signal transmitter 109 is configured to modulate and transmit a signal 117 that comprises color information data generated by the color information data generator 105. As will be discussed below, the signal 117 is preferably transmitted as a more or less focused beam of electromagnetic radiation, although some embodiments do not necessarily require a focused beam in order to function according to the invention.

The signal 117 is received by a receiver 111 in a lighting system 103 that also comprises a lighting element 115 as well as a controller 113. As indicated by reference numeral 131, light of a desired color is emitted by the system 103 via the lighting element 115.

Turning now to FIG. 2, a remote control device 201 comprises, similar to the device 101 in FIG. 1, a color information data generator 205, a controller 207 and a signal transceiver 209. The transceiver 209 is configured to operate a bidirectional communication channel, as indicated by the signal symbol 217, together with a corresponding system transceiver 211 connected to a controller 213 in a lighting system 203. Information regarding desired and emitted color of light and possibly also information regarding desired and emitted intensity of light is exchanged via the bi-directional channel 217. In contrast to the system discussed above in connection with FIG. 1, the system 203 comprises a plurality of lighting elements 215a-c that are individually controllable via the controller 213 to emit light 231a-c having a desired color and intensity. As the skilled person will understand, the system 203 may comprise any number of lighting elements arranged in any desired spatial configuration relative to each other, including a rectangular array of elements as well as a more irregular distribution.

The system 203 may also comprise a position detector 212 capable of detecting, e.g., a distance between the remote control device 201 and the lighting elements 215 of the system 203. Such a distance detection may be utilized in the controller 213 to determine which lighting element is to be controlled, assuming that a user of the remote control device 201 indicates the desired lighting element by positioning the remote control device 201 at an appropriate position in relation to the desired lighting device.

Turning now to FIG. 3, a remote control device 301 is shown that is configured, similar to the devices described above, to communicate via an information channel 317 with a lighting system 303 through receivers 311a-b. The system 303 comprises a controller 313, connected to the receivers 311a-b, which is configured to control the color and intensity of light 331a-b emitted by respective lighting elements 315a-b. Similar to the device and system discussed above in connection with FIG. 2, relative positions between the device 301 and the lighting devices 315 may be determined by the controller 313 in that each receiver 311 may be spatially associated with respective lighting element 315.

Turning now to FIG. 4, a remote control device 401 is shown that is configured, similar to the devices described above, to communicate via a bidirectional information channel 417 with a lighting system 403 through transceivers 411 and 421. The system 403 comprises two controllers 413 and 423, connected to respective transceivers 411 and 421. The controllers 413, 423 are configured to control the color and intensity of light 431 and 433 emitted by respective lighting elements 415 and 425.

In addition to being configured to communicate with the remote control device 401, the transceivers 411 and 421 of the system 403 are configured to communicate with each other, as indicated by a bidirectional system channel 435. Such "internal" communication within the system 403 may be utilized to transfer, via the respective controllers 413 and 423, color and intensity information between lighting elements in the system and thereby provide a "cascading effect" in the sense that a desired color that has been transmitted to one lighting element is automatically provided also to other lighting elements within the system.

It is also to be noted that the controllers of the systems discussed above may be configured to adjust the color of light emitted from the lighting elements gradually during a predetermined time period. Moreover, in a system having several lighting elements, when a first lighting element has obtained a desired color as a result of control by a remote control device, one or several other lighting elements of the system may gradually obtain the same desired color.

Turning now to FIG. 5, a detailed description of a remote control device 501 according to the present invention will be presented. The remote control device 501 comprises a controller light source 505, which is capable of emitting colored light 513 under control by a controller 507. Preferably, the controller light source 505 is in the form of a collection of LED sources, as the skilled person will realize. The colored light 513 from the controller light source 505 is focused into a beam 519 of light 513' by an optical focusing device 515, which typically is in the form of a collection of lenses, as the skilled person will realize. The emitted light 513 from the controller light source 505 is visible to a user of the device 501 via a window 517.

Selection of a desired color to be emitted by the remote control device 501 is enabled by means of a color selection input unit 509. The color selection input unit 509 is typically realized by a collection of buttons and/or dials, connected to the control unit 507. By user manipulation of the input unit 509, a desired color is generated and emitted by an interaction between the controller 507 and the controller light source 505, via the optical focusing device 515.

Alternatively or additionally, the remote control device 501 is configured to detect a desired color by means of a color detection unit 511 connected to the controller 507. The color detection unit 511 is typically realized by means of one or more photo detectors that are capable of detecting light 511 reflected from a color reference surface 521 or directly from a light-emitting source, possibly via additional optical means (not shown). A user is thus enabled to select a desired color by using the remote control device 501 to detect a color from, e.g., an object or a lamp reflecting and emitting light, respectively, of the desired color.

The detection unit 511 may also be in the form of a color camera capable of detecting two-dimensional images containing color patterns from which a desired color or a pattern of colors may be selected, more or less automatically, and transmitted to one or more lighting element in a system such as the system shown in FIG. 2.

FIG. 5 also shows a simple representation of a lighting system 503 that is controlled to emit light 535 of the desired color. The lighting system comprises a light detector 531, which typically includes a set of color filters (not shown) and one or more photo detectors connected to color determination circuitry 527. The color determination circuitry is capable of recognizing the received light 513' beamed from the remote control device 501 and to provide signals to driving circuitry 529 that drives a lighting element 533. The lighting element 533 is preferably realized by means of LED sources, as the skilled person will realize.

In addition to controlling the color of light 535 emitted by the lighting system 502, the remote control device 501 is preferably configured to also control the intensity of the emitted light 535. This is achieved by modulating the intensity of the light 513 emitted by the controller light source 505 with an AC frequency, the frequency being the carrier of intensity level information, e.g. encoded using any known standard within the field such as RC5. Selection of intensity level is performed, as for the selection of a desired color, by means of the input unit 509 and the controller 507. When received by the detector 531 of the lighting system 503, the AC modulated light 513' is high frequency filtered in the detector 531 and the color determination circuitry 527, whereupon the driving circuitry 529 drives the lighting element 533 to emit the desired intensity of light as well as the desired color of light. By using a high frequency modulation, i.e. >>50 Hz, any undesired effects from ambient artificial light might be avoided.

Although only one lighting system 503 having one lighting element 533 is shown in FIG. 5, any number of systems similar to the system 503 may be used, i.e. controlled by the remote control device 501, when realizing the invention. By pointing the beam 519 of light towards individual lighting systems, a user is able to select desired colors for different lighting systems. Moreover, by changing the focusing properties of the beam, i.e. de-focusing via additional focus manipulation means on the input unit 509 or by direct manipulation of the focusing device 515, a wider beam may be obtained which can be pointed in a general direction towards a plurality of lighting systems and thereby enabling simultaneous color and intensity control of a large number of lighting elements.

Figure 6:
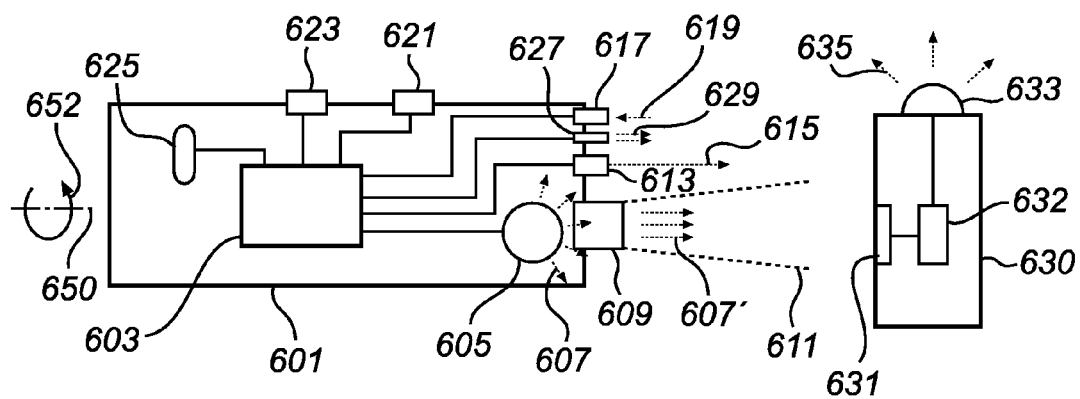
FIG. 6 shows schematically a block diagram illustrating another embodiment of a device for wireless control according to the present invention.

Turning now to FIG. 6, another embodiment of a remote control device 601 will be described. Similar to the description above in relation to FIG. 5, the device 601 is configured to control a lighting system 630. However, in contrast to the situation in FIG. 5, the remote control device 601 and the system 630 is configured to operate using beamed 611 infrared (IR) radiation 607' as information carrier for color and intensity information data.

As in the previous example, the remote control device 601 comprises a controller 603 that controls all operation of the device 601. To the controller 603 are a number of operation means connected: a copy color switch 621, a paste color switch 623, a color detector 617, an auxiliary light source 627, a laser beam generator 613 and an infrared radiation (IR) source 605. As in the previous example, optical focusing means 609 are arranged to focus radiation 607 emitted by the IR source into a focused beam 611 of IR radiation 607' that is incident on an IR detector 631 in the lighting system 630. The device controller 603 encodes color information data representing a desired color, and possibly also a desired intensity, into a signal (not shown) that is modulated, using e.g. the well known RC5 protocol, and transmitted by the IR source 605. The laser beam generator 613 is typically controlled to emit a beam 615 that results in a visible spot or pattern on a surface onto which the laser beam 615 is incident. Moreover, the visible spot or pattern generated by the laser beam 615 is preferably such that it corresponds to the IR beam 611.

A controller 632 in the system 630 decodes the color information data carried by the detected IR radiation 607' and controls a lighting element 633 in the system to emit light 635 of a desired color and intensity, in a similar manner to the example discussed above in connection with FIG. 1.

The desired color is determined by a user of the remote control device 601 by way of triggering color detection by actuating the copy color switch 621. The triggering activates the color detector 617, which receives light 619 reflected from a color reference surface or object (not shown), as in the example above, or directly from a light source emitting light of the desired color and provides color information to the controller 603 in a similar manner as above. By actuation of the paste color switch 623, the controller 603 then controls the IR source to transmit the detected desired color as described above.

An undo-function may be realized by providing an additional undo-switch (not shown) connected to the controller 603. The controller 603 may be configured to distinguish a first activation of the undo-switch for shortly previewing the copied color on the lighting element 633, followed by a second activation of the undo-switch for really pasting the color.

In an embodiment where the remote control device 603 forms part of an RC5 controlled lighting environment, the remote control device 603 may be used in a simple manner to copy a color from a first lighting system to a second lighting system. This is achieved by performing a first color detection while the source of auxiliary light 627 is active and a second color detection while the source of auxiliary light 627 is inactive, and then perform a comparison of results from the two color detections. The comparison yields a determination of whether the first and second detections are of reflected light emanating from a surface or not. That is, when the difference between the two detections is minimal, it means that the remote control device 603 is not adjacent to a reference surface and it is concluded that the desired action is to copy an already existing color setting of a lighting system in the RC5 environment, whereupon an RC5 "copy lamp" command is transmitted. The following "paste" command will then use the setting.

A desired color may also be detected, as in the embodiment described with reference to FIG. 5, by detecting reflected light from a surface (not shown) that is illuminated by the auxiliary light 629.

The source of auxiliary light 627 may be a source of white light or any combination of more or less monochromatic light sources utilized, e.g., in a scanning fashion.

In addition to controlling the color of light emitted by the lighting system 630, the remote control device 601 is also capable of controlling the intensity of light emitted by the lighting system 630. A desired intensity is detected by a motion detector 625 connected to the controller 603. For example, by quickly turning the remote control device 603 around a longitudinal axis 650 as indicated by arrow 652, the motion detector 625 detects and quantifies the amount of turning, whereupon the controller 603 encodes the turning into a desired intensity level increase or decrease. The intensity level increase or decrease is then modulated, as for the color information data, in the IR beam transmitted to the lighting system 630.

Figure 7:
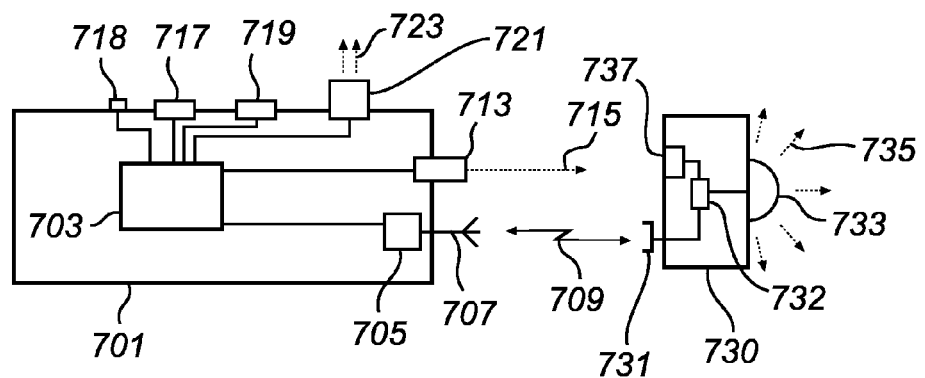
FIG. 7 shows schematically a block diagram illustrating yet another embodiment of a device for wireless control according to the present invention.

Turning now to FIG. 7, yet another embodiment of a remote control device 701 will be described. Similar to the embodiment described above in connection with FIGS. 5 and 6, the device 701 is configured to control a lighting system 730 that preferably forms part of an RC5 environment or similar environment utilizing a lighting control protocol. In contrast to the situation in FIGS. 5 and 6, the remote control device 701 and the system 730 is configured to operate using short range RF, such as Bluetooth®, as an information carrier channel for color and intensity information data. Nevertheless, it is also feasible to use an IR channel such as described above.

As in the previous example, the remote control device 701 comprises a controller 703 that controls all operation of the device 701. To the controller 703 are a number of operation means connected: a selection switch 717, a toggle switch 718, an adjustment button 719, a color light source 721, a laser beam generator 713 and an RF transceiver 705 with an associated antenna 707.

By activation of the selection switch 717 a laser beam 715 is generated by the laser beam generator 713. When pointed in a direction towards the lighting system 730, and in particular onto a laser beam detector 737 in the system 730, the system controller 732 recognizes this as a triggering signal and establishes an RF communication channel 709 with the controller 703 in the remote control device 701. Via the RF channel 709, color and intensity information data are transmitted to the controller 703 in the remote control device 701, whereupon the color and intensity information is decoded and presented as a colored light emitted by the color light source 721 in the remote control device 701.

A user perceives the light emitted by the color light source 721 and then operates the adjustment button 719 to adjust, via the controller 703, the light emitted by the color light source 721 to be that of a desired color. The adjustment to the color is also transmitted by the controller 703, after encoding via the RF transceiver 705 and antenna 707 to the lighting system 730. Adjustment of the desired intensity is performed in a similar manner, for example triggered by the user operating the toggle switch 718, by adjustment to a desired intensity by operation of the adjustment button 719 followed by encoding and transmission to the lighting system as described above with reference to the color information. In other words, the user may thus toggle between color and intensity control as desired by manipulation of the toggle switch 718.

The controller 732 in the system 730 then receives, via the antenna 731 and the transceiver 730, and decodes the color information data and intensity information data carried by the received RF signal 709. The system controller 732 then uses this encoded information to control a lighting element 733 in the system to emit light 735 of the desired color and intensity.

Although the invention has been described by the use of a number of individual exemplifying embodiments, it is foreseen that combinations of features of the different examples may be realized into other embodiments exemplifying the invention, all these additional examples also being within the scope of the appended claims.

The invention claimed is:

1. A device for wireless control of color of light emitted by a lighting system, said lighting system comprising signal receiving means and means for adjusting the color of light emitted from at least one lighting element, in response to a received color control signal, said device for wireless control comprising means for:
generating color information data, said data being indicative of a desired color of light to be emitted by the lighting system,
modulating a first carrier signal in accordance with the color information data, and
transmitting said color control signal in the form of a beam of said first modulated carrier signal to the lighting system, wherein
said means for transmitting a beam are configured to adjust the angular extent of the beam.

2. A device according to claim 1, further comprising means for displaying said desired color, said means for displaying being configured such that the desired color is perceivable by a user of the device.

3. A device according to claim 1, further comprising means for storing said color information data.

4. A device according to claim 1, further comprising means for:
generating intensity information data, said data being indicative of a desired intensity of light to be emitted by the lighting system,
modulating said first carrier signal also in accordance with the intensity information data.

5. A device according to claim 1, further comprising means for:
generating intensity information data, said data being indicative of a desired intensity of light to be emitted by the lighting system,
modulating a second carrier signal in accordance with the intensity information data, and
transmitting a beam of said second modulated carrier signal to the lighting system.

6. A device according to claim 5, where:
said means for generating color information data and said means for modulating a first carrier signal comprise color setting means configured to be set to said desired color and a color light unit configured to emit light of said desired color set by said color setting means, and
said means for transmitting a beam of said first modulated carrier signal comprises optical focusing means configured to focus said light emitted by said color light unit.

7. A device according to claim 6, where:
said means for modulating said first carrier signal also in accordance with the intensity information data are configured to modulate the first carrier signal by a frequency, said frequency being indicative of said intensity information data.

8. A device according to claim 5, where said lighting system further comprises means for transmitting system color information data indicative of the color of light emitted from at least one of said at least one lighting element, said device further comprising means for:
generating and transmitting a beam of a selection signal, said selection signal for selecting a specific lighting element to receive said color control signal,
receiving said system color information data from said selected lighting element, and where said means for displaying the desired color is configured to display the system color information.

9. A device according to claim 8, where said means for generating and transmitting a beam of a selection signal is further configured to transmit a beam of a de-selection signal for de-selecting said specific lighting element.

10. A device according to claim 8, where said lighting system further comprises means for transmitting system intensity information data indicative of the intensity of light emitted from at least one of said at least one lighting element, said device further comprising means for:
detecting a user action indicating that intensity information data is to be transmitted between the device and the system,
receiving said system intensity information data, and where said means for displaying the desired color is further configured to display the system intensity information. movement into intensity information data.

11. A device according to claim 10, where said means for detecting a user action indicating that intensity information data is to be transmitted between the device and the system is further configured to detect a user action indicating that color information data is to be transmitted between the device and the system.

12. A device according to claim 1, where:
said means for generating color information data and said means for modulating a first carrier signal comprise color detection means and a color light unit configured to emit light of a color detected by said color detection means, and
said means for transmitting a beam of said first modulated carrier signal comprises optical focusing means configured to focus said light emitted by said color light unit.

13. A device according to claim 5, where:
said means for generating color information data comprise color detection means configured to detect said desired color,
said means for modulating a first carrier signal comprise means for digital modulation of an IR-beam, and
said means for transmitting a beam of said first modulated carrier signal comprises optical focusing means configured to focus said IR-beam.

14. A device according to claim 13, further comprising means for generating a collimated light beam having a beam direction parallel to said IR-beam.

15. A device according to claim 13, where:
said color detection means are configured to detect said desired color from a surface.

16. A device according to claim 15, where:
said color detection means comprise a source of auxiliary light configured to illuminate said surface.

17. A device according to claim 16, where:
said means for generating color information data are configured to perform a first color detection while said source of auxiliary light is active and a second color detection while said source of auxiliary light is inactive, and perform a comparison of results from said two color detections, said comparison yielding a determination of whether said first and second detections are of light emanating from a surface or not.

18. A device according to claim 13, where said means for generating intensity information data comprises rotation sensing means configured to sense a rotational movement of the device and to quantify the sensed rotational movement into intensity information data.

19. A lighting system comprising means for adjusting the color of light emitted from at least one lighting element, in response to a control signal received from a device for wireless control of color of light emitted by the system according to claim 1, wherein said lighting system comprises a plurality of lighting elements and further comprises at least one detector for detecting a minimum relative distance between the device for wireless control and respective lighting elements, and where said means for adjusting the color of light is configured to adjust a specific lighting element, said specific lighting element being determined by said determined minimum distance.

20. A lighting system according to claim 19, configured to adjust the color of at least two lighting elements in response to said received color control signal.

21. A lighting system according to claim 19, configured to adjust said color of light emitted from at least one lighting element gradually during a predetermined time period.

22. A device for wireless control of color of light emitted by a lighting system, comprising:
a lighting system having a signal receiver and control electronics operable to adjust the color of light emitted from at least one lighting element in response to a received color control signal;
a wireless control device having a color information data generator to generate color information data, said data being indicative of a desired color of light to be emitted by said lighting system;
a modulator for modulating a first carrier signal in accordance with said color information data; and
a transmitter for transmitting said color control signal in the form of a beam of said first modulated carrier signal to said lighting system;
wherein said wireless control device further includes an optical focusing device for to adjust the angular extent of said beam;
said lighting system further having a plurality of lighting elements and at least one detector for detecting a minimum relative distance between said wireless control device and said respective lighting elements, said system further including color adjustment driver electronics which is operable to configure one of said respective lighting element, said respective lighting element being determined by said determined minimum distance.

* * * * *